(12) United States Patent
Koito

(10) Patent No.: US 9,779,877 B2
(45) Date of Patent: Oct. 3, 2017

(54) FILM CAPACITOR

(71) Applicant: TOYOTA JIDOSHA KABUSHIKI KAISHA, Toyota-shi, Aichi-ken (JP)

(72) Inventor: Yuichi Koito, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 4 days.

(21) Appl. No.: 14/853,281

(22) Filed: Sep. 14, 2015

(65) Prior Publication Data

US 2016/0079000 A1 Mar. 17, 2016

(30) Foreign Application Priority Data

Sep. 16, 2014 (JP) .................................. 2014-187841

(51) Int. Cl.
| | |
|---|---|
| *H01G 4/32* | (2006.01) |
| *H01G 4/015* | (2006.01) |
| *H01G 4/18* | (2006.01) |
| *H01G 4/012* | (2006.01) |

(52) U.S. Cl.
CPC .............. *H01G 4/32* (2013.01); *H01G 4/015* (2013.01); *H01G 4/18* (2013.01); *H01G 4/012* (2013.01)

(58) Field of Classification Search
CPC  H01G 4/005; H01G 4/08; H01G 4/32; H01G 4/015; H01G 2/16; H01G 4/18; H01G 4/012; H01G 4/228
See application file for complete search history.

(56) References Cited

U.S. PATENT DOCUMENTS

| | | | | | |
|---|---|---|---|---|---|
| 5,905,628 | A | * | 5/1999 | Okuno ................... | H01G 4/012 29/25.42 |
| 7,911,765 | B2 | * | 3/2011 | Takeoka .................. | H01G 4/01 361/301.5 |
| 8,310,802 | B2 | * | 11/2012 | Fujii ...................... | H01G 4/015 361/275.4 |
| 8,593,781 | B2 | * | 11/2013 | Takagaki ............... | H01G 4/012 361/273 |
| 2008/0232024 | A1 | * | 9/2008 | Yang ....................... | H01G 2/16 361/303 |
| 2008/0278888 | A1 | * | 11/2008 | Yang ....................... | H01G 2/16 361/323 |
| 2015/0162130 | A1 | * | 6/2015 | Hirota .................... | H01G 2/16 361/275.4 |

FOREIGN PATENT DOCUMENTS

| | | |
|---|---|---|
| JP | 2006-269727 A | 10/2006 |
| JP | 2007-067169 A | 3/2007 |

\* cited by examiner

*Primary Examiner* — Nguyen Ha
(74) *Attorney, Agent, or Firm* — Sughrue Mion, PLLC

(57) ABSTRACT

A film capacitor includes a pair of mutually opposed dielectric films; and evaporated electrodes respectively provided on the pair of dielectric films. The evaporated electrode provided on one of the pair of dielectric films includes slits that are regions in which the evaporated electrode is not provided, a plurality of electrode regions defined by the slits, and at least one fuse portion that connects the electrode regions adjacent to each other. The one dielectric film, on which the evaporated electrode including the slits and the at least one fuse portion is provided, includes at least one through portion that extends through the one dielectric film, the at least one through portion being provided in at least one area corresponding to at least one of the slits adjacent to the at least one fuse portion.

2 Claims, 2 Drawing Sheets

FILM CAPACITOR

INCORPORATION BY REFERENCE

The disclosure of Japanese Patent Application No. 2014-187841 filed on Sep. 16, 2014 including the specification, drawings and abstract is incorporated herein by reference in its entirety.

BACKGROUND OF THE INVENTION

1. Field of the Invention

The invention relates to a film capacitor including stacked dielectric films on each of which electrode metal is evaporated.

2. Description of Related Art

Generally, there is known, for example, a metallized film capacitor that is used to smooth an inverter circuit for an automobile (see Japanese Patent Application Publication No. 2006-269727 (JP 2006-269727 A)). The metallized film capacitor described in JP 2006-269727 A includes a first metallized film and a second metallized film. The first metallized film includes an evaporated metal electrode. The second metallized film includes an evaporated metal electrode, and the evaporated metal electrode is split by slits into split electrodes.

The split electrodes of the second metallized film are connected in parallel with each other by fuses. The surface roughness of the evaporated metal electrode side of the dielectric film that constitutes the second metallized film is smaller than the surface roughness of the evaporated metal electrode side of the dielectric film that constitutes the first metallized film. According to JP 2006-269727 A, protective performance improves due to the side having a high surface roughness, and dielectric strength (withstand voltage) and service life improve due to the side having a high surface roughness.

There is known a metallized film capacitor in which adjacent evaporated electrodes are opposed via a dielectric film, each evaporated electrode is split into a plurality of small electrodes to form fuse portions, one of the dielectric films, which overlaps with the evaporated electrode of the other dielectric film, has holes or recesses in regions that overlap with the fuse portions of the other dielectric film (see Japanese Patent Application Publication No. 2007-67169 (JP 2007-67169 A)). According to JP 2007-67169 A, pressing action, in which the one dielectric film presses the fuse portions and their vicinities of the other dielectric film, is reduced, and therefore, it is possible to provide a metallized film capacitor having high protective performance and high safety.

In the above-described film capacitors, a further reduction in size is required. In addition, a dielectric film is becoming thinner. In the metallized film capacitor described in JP 2006-269727 A, if each dielectric film becomes thinner, it becomes impossible to sufficiently roughen the evaporated metal electrode side of the dielectric film that constitutes the second metallized film, that is, it becomes impossible to provide small unevenness, with the result that it becomes difficult to ensure protective performance. In the metallized film capacitor described in JP 2007-67169 A, it is difficult to align the holes or recesses of the one dielectric film with the fuse portions of the other dielectric film.

SUMMARY OF THE INVENTION

The invention provides a film capacitor that allows a reduction in size by using thin dielectric films, that allows easy alignment of the mutually opposed dielectric films and that has high safety with high self-protective performance.

An aspect of the invention relates to a film capacitor including a pair of mutually opposed dielectric films; and evaporated electrodes respectively provided on the pair of dielectric films. The evaporated electrode provided on one of the pair of dielectric films includes slits that are regions in which the evaporated electrode is not provided, a plurality of electrode regions defined by the slits, and at least one fuse portion that connects the electrode regions adjacent to each other. The one dielectric film, on which the evaporated electrode including the slits and the at least one fuse portion is provided, includes at least one through portion that extends through the one dielectric film, the at least one through portion being provided in at least one area corresponding to at least one of the slits adjacent to the at least one fuse portion.

In the film capacitor, the slits are the regions in which the evaporated electrode is not provided, and a surface of the dielectric film is exposed through the slits. The fuse portion is a portion which is provided between the slits that partition the evaporated electrode into the plurality of electrode regions, and at which the width of the evaporated electrode is narrowed, and the adjacent electrode regions are connected to each other by the fuse portion. The configuration of the at least one through portion is not specifically limited. For example, each of the at least one through portion may be constituted by a plurality of through holes, each of the at least one through portion may be constituted by a cut portion provided in the dielectric film to extend along the corresponding slit, or each of the at least one through portion may be constituted by a perforated portion in which cut portions are intermittently formed.

In the film capacitor, for example, the paired long strip dielectric films (the pair of long strip dielectric films) are stacked, and are rolled in a state where both the evaporated electrodes are opposed via one of the dielectric films. For example, external electrodes are respectively provided by metal spraying on the end faces of the rolled body. For example, an electrically insulating resin material, such as polypropylene (PP), may be used as the material of the dielectric films. For example, an electrically conductive metal material, such as aluminum (Al), may be used as the material of the evaporated electrodes.

In the film capacitor, for example, an excessive current may flow through any of the electrode regions of the evaporated electrode of the one of the dielectric films because of an insulation breakdown (electrical breakdown), or the like. In such a case, the fuse portion that connects the electrode region to the other adjacent electrode region has a relatively narrow width and has a small cross-sectional area through which current flows, and therefore, the current density increases to cause a high temperature, and the fuse portion is cut off as a result of, for example, vaporization of the evaporated metal. Thus, insulation between the evaporated electrodes opposed via the dielectric film is recovered (restored). Thus, the film capacitor has self-protective performance such that insulation is recovered at the time when there occurs an insulation breakdown (electrical breakdown).

Generally, when the film capacitor exhibits self-protective performance, the evaporated metal or the dielectric films may rise in temperature to produce gas. If the gas accumulates, for example, between the dielectric films, an insulation breakdown voltage (electrical breakdown voltage) may decrease or electrical insulation may not be recovered (restored) and a short circuit of the film capacitor may be caused. If a gap is formed between the dielectric films, the capacitance may decrease.

As described in JP 2006-269727 A, it may be possible to cause the gas to escape through small unevenness formed by roughening the dielectric films. However, if a dielectric film becomes thinner, it may become impossible to provide sufficient unevenness and it may become difficult to allow gas to escape.

As described in JP 2007-67169 A, holes are provided in one of the mutually opposed dielectric films, in which no fuse portion is provided, and therefore, it may be possible to cause the gas to escape through the holes. However, it is difficult to align the holes provided in the one of the dielectric films with the fuse portions provided in the other dielectric film, and therefore, it may be difficult to cause the gas to escape.

In contrast, in the film capacitor according to the above-described aspect of the invention, the one of the dielectric films, on which the evaporated electrode including the slits and the at least one fuse portion is provided, includes at least one through portion that is provided in at least one area corresponding to at least one of the slits adjacent to the at least one fuse portion. Therefore, gas generated at the time when the film capacitor exhibits self-protective performance is diffused from between the plurality of layers (dielectric films) via the at least one through portion. Thus, accumulation of gas between the dielectric films is prevented, and therefore, it is possible to prevent a short circuit of the film capacitor.

The at least one through portion is provided in the one of the dielectric films, on which the evaporated electrode including the slits and the at least one fuse portion is provided. Therefore, it is possible to reliably and easily arrange the through portion(s) at the position(s) adjacent to the fuse portion(s) without precise alignment of the pair of dielectric films. Unlike the case where unevenness is provided in the dielectric films, even when the dielectric films become thinner, it is possible to easily provide the at least one through portion.

When each of the at least one through portion is constituted by a cut portion provided in the dielectric film to extend along the corresponding slit, it is possible to allow gas to escape over a wide range along the corresponding slit. Because an insulation distance is ensured, a new insulation distance does not need to be provided, and therefore, it is possible to prevent a decrease in the capacitance of the film capacitor. Here, the insulation distance is a distance required to prevent a creeping discharge.

As can be understood from the above description, with the film capacitor according to the invention, it is possible to provide the film capacitor that allows a reduction in size by using the thin dielectric films, that allows easy alignment of the pair of dielectric films and that has high safety with high self-protective performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a film capacitor according to an embodiment of the invention will be described with reference to the accompanying drawings. For the sake of simple illustration of the configuration of the invention, the scale of each component may be shown differently from an actual scale.

Figure 1:
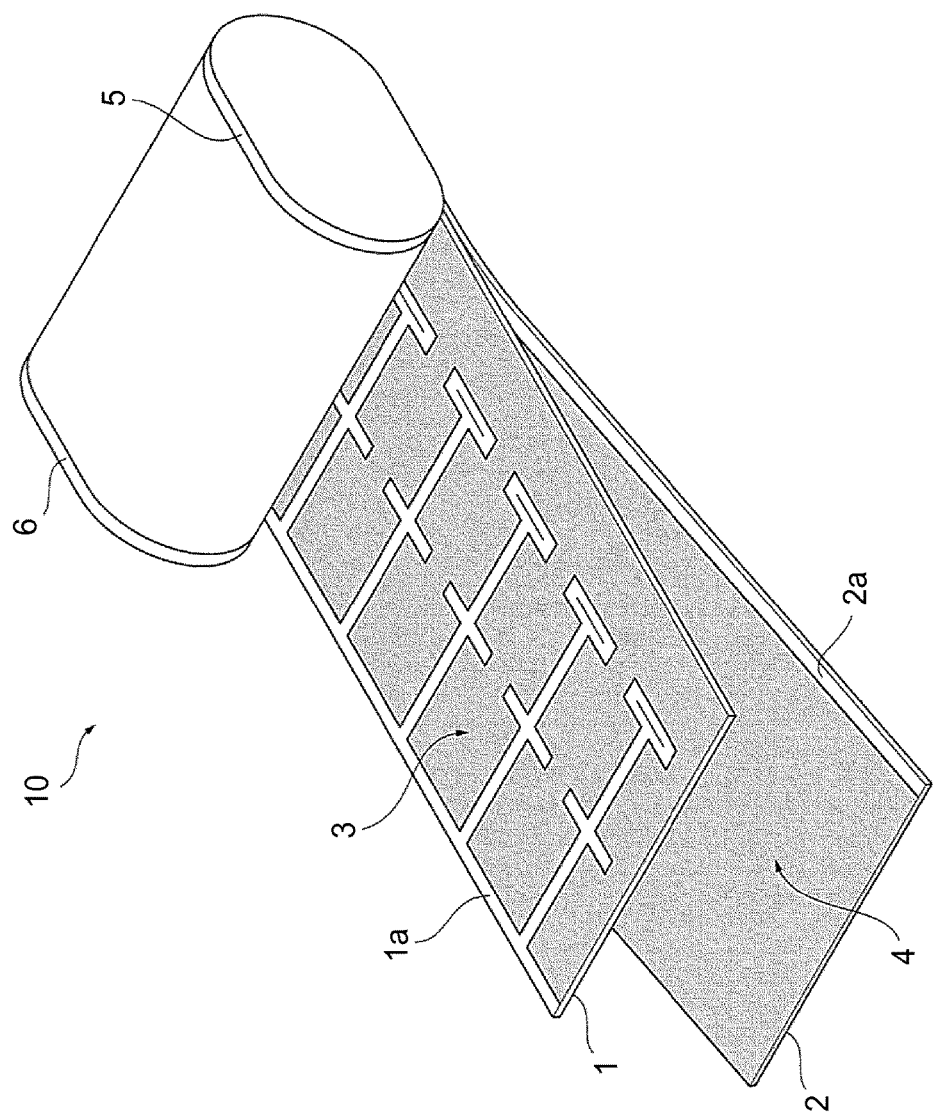
FIG. 1 is a perspective view that shows a film capacitor according to an embodiment of the invention.

FIG. 1 is a perspective view of the film capacitor according to the embodiment of the invention with partially expanded.

The film capacitor 10 according to the present embodiment includes a pair of mutually opposed dielectric films 1, 2. An evaporated electrode 3 is provided on the surface of the dielectric film 1. An evaporated electrode 4 is provided on the surface of the dielectric film 2. Each of the pair of dielectric films 1, 2 according to the present embodiment is a long strip of resin film. The dielectric film 1 has a non-evaporated portion (margin) 1a at one side in the width direction, the non-evaporated portion 1a having a predetermined width, and extending along the longitudinal direction. The dielectric film 2 has a non-evaporated portion (margin) 2a at one side in the width direction, the non-evaporated portion 2a having a predetermined width, and extending along the longitudinal direction. At the non-evaporated portion 1a, no evaporated electrode 3 is provided, and the dielectric film 1 is exposed. At the non-evaporated portion 2a, no evaporated electrode 4 is provided, and the dielectric film 2 is exposed.

The pair of dielectric films 1, 2 are stacked so as to be mutually opposed such that the evaporated electrodes 3, 4 are opposed via the dielectric film 1, and are rolled around an axis parallel to the width direction. External electrodes 5, 6 are respectively provided by metal spraying on one and the other end faces of the rolled dielectric films 1, 2. The external electrode 5 is connected to the evaporated electrode 3 of the dielectric film 1. The external electrode 6 is connected to the evaporated electrode 4 of the dielectric film 2.

The material of the dielectric films 1, 2 is not specifically limited. For example, electrically insulating resin materials, such as polypropylene (PP), polyethylene terephthalate (PET), polyphenylene sulfide (PPS), polyethylene naphthalate (PEN) and polyvinylidene difluoride (PVDF), may be used. The material of the evaporated electrodes 3, 4 is not specifically limited. For example, electrically conductive metal materials, such as aluminum (Al) and zinc (Zn), may be used. The material of the external electrodes 5, 6 is not specifically limited. For example, tin (Sn), copper (Cu), zinc (Zn), or an alloy of two or more of them, may be used.

Figure 2:
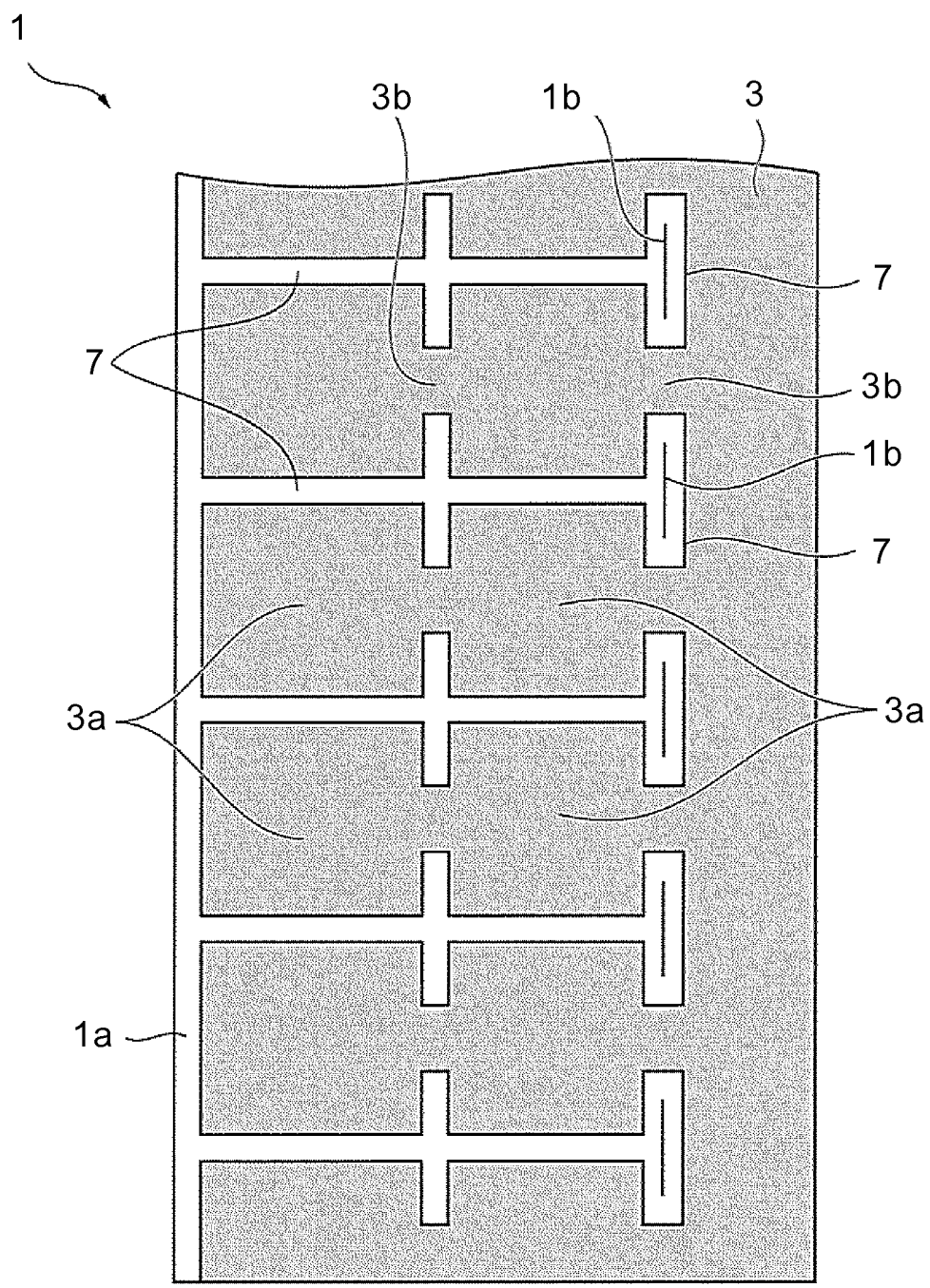
FIG. 2 is an enlarged plan view of one of dielectric films of the film capacitor shown in FIG. 1.

FIG. 2 is an enlarged plan view that shows the dielectric film 1 that is one of the pair of dielectric films 1, 2 of the film capacitor 10 shown in FIG. 1.

The evaporated electrode 3 provided on the surface of the dielectric film 1 includes slits 7. The slits 7 are regions in which no evaporated electrode 3 is provided. The surface of the dielectric film 1 is exposed through the slits 7. The slits 7 partition the evaporated electrode 3 into a plurality of electrode regions 3a (i.e., the plurality of electrode regions 3a are defined by the slits 7). The slits 7 extend in mutually intersecting two directions along the outer peripheries of the rectangular electrode regions 3a, and have discontinuous portions in at least one of the extending directions. The evaporated electrode is provided at each discontinuous portion. An evaporated electrode region provided at each discontinuous portion is a fuse portion 3b according to the invention.

Each fuse portion 3b is provided between the slits 7 that partition the evaporated electrode 3, and the width of each fuse portion 3b is smaller than the width of each electrode region 3a (i.e., the width of each fuse portion 3b is smaller than the width of the other portion of the evaporated electrode 3). The mutually adjacent electrode regions 3a are connected to each other by the fuse portion 3b. In this way, because each fuse portion 3b has a small width, the cross-sectional area of each fuse portion 3b, through which current flows, is smaller than that of the other portion of the evaporated electrode 3.

The dielectric film 1 on which the fuse portions 3b are provided in the evaporated electrode 3 (i.e., the dielectric film 1 on which the evaporated electrode 3 including the fuse portions 3b is provided) includes through portions 1b provided in areas corresponding to the slits 7 adjacent to the fuse portions 3b. The configuration of each through portion 1b is not specifically limited as long as the through portion 1b is able to discharge gas between the dielectric films 1, 2. Each through portion 1b according to the present embodiment is a cut portion provided in the dielectric film 1 to extend along a corresponding one of the slits 7. The through portions 1b may be provided adjacently to all the fuse portions 3b or may be selectively provided adjacently to specified fuse portions 3b. That is, at least one through portion 1b is provided adjacently to at least one fuse portion 3b.

The dielectric film 2 of the pair of dielectric films 1, 2 shown in FIG. 1 is arranged so as to be opposed to the dielectric film 1 on which the slits 7 and the fuse portions 3b are provided in the evaporated electrode 3 (i.e., the dielectric film 1 on which the evaporated electrode 3 including the slits 7 and the fuse portions 3b is provided). The evaporated electrode 4 on the dielectric film 2 is not provided with the slits 7 and does not have the plurality of electrode regions 3a or the fuse portions 3b. That is, with regard to the dielectric film 2 that is opposed to the dielectric film 1, the evaporated electrode 4 is provided on substantially the entire surface of the dielectric film 2 other than the non-evaporated portion 2a provided at one side in the width direction. For example, lead wires (not shown) are bonded to the external electrodes 5, 6 of the pair of rolled dielectric films 1, 2, and the rolled dielectric films 1, 2 are covered with an exterior material (not shown), such as epoxy resin.

Hereinafter, the effects of the film capacitor 10 according to the present embodiment will be described.

If an insulation breakdown (electrical breakdown) occurs in the film capacitor 10 due to some cause, excessive current flows from one of the electrode regions 3a of the evaporated electrode 3 of the dielectric film 1, corresponding to the portion at which the insulation breakdown has occurred, to the adjacent electrode region 3a via the fuse portion 3b. The fuse portion 3b has a width extremely smaller than that of the electrode region 3a, and has a small cross-sectional area through which current flows, and therefore, the current density locally increases to cause a high temperature, and the fuse portion 3b is cut off as a result of, for example, vaporization of the evaporated metal.

Thus, a current path is interrupted between the electrode region 3a corresponding to the portion at which the insulation breakdown has occurred and the electrode region 3a adjacent to the above-mentioned electrode region 3a, and therefore, electrical insulation between the evaporated electrodes 3, 4 opposed via the dielectric film 1 is recovered (restored). When the film capacitor 10 exhibits self-protective performance as described above, evaporated metal or the dielectric films 1, 2 may rise in temperature to produce gas. If the gas, for example, accumulates between the dielectric films 1, 2, an insulation breakdown voltage (an electrical breakdown voltage) may decrease or electrical insulation may not be recovered (restored), and a short circuit of the film capacitor 10 may be caused.

In the film capacitor 10 according to the present embodiment, the dielectric film 1 on which the plurality of electrode regions 3a and the plurality of fuse portions 3b are provided in the evaporated electrode 3 (the dielectric film 1 on which the evaporated electrode 3 including the plurality of electrode regions 3a and the plurality of fuse portions 3b is provided) includes the through portions 1b provided in areas corresponding to the slits 7 adjacent to the fuse portions 3b. Therefore, gas produced at the time when the film capacitor 10 exhibits self-protective performance is discharged from between the dielectric films 1, 2 via the through portions 1b, and is diffused. Thus, accumulation of gas between the dielectric films 1, 2 is prevented, with the result that it is possible to prevent a short circuit of the film capacitor 10.

In the pair of dielectric films 1, 2, the through portions 1b are provided in the dielectric film 1 on which the fuse portions 3b are provided in the evaporated electrode 3 (i.e., the dielectric film 1 on which the evaporated electrode 3 including the fuse portions 3b is provided). Therefore, it is possible to reliably and easily arrange the through portions 1b at the positions adjacent to the fuse portions 3b without precise alignment of the pair of dielectric films 1, 2. Unlike the case where the dielectric films 1, 2 have unevenness, even when the dielectric films 1, 2 become thinner, it is possible to easily provide the through portions 1b.

Because the through portions 1b are cut portions formed in the dielectric film 1 to extend along the extending direction of the slits 7, it is possible to allow gas to escape over wide ranges along the slits 7. Because an insulation distance is ensured, a new insulation distance does not need to be provided, and therefore, it is possible to prevent a decrease in the capacitance of the film capacitor 10. Here, the insulation distance is a distance required to prevent a creeping discharge.

As described above, with the film capacitor 10 according to the invention, it is possible to provide the film capacitor 10 that allows a reduction in size by using the thin dielectric films 1, 2, that allow easy alignment of the pair of dielectric films 1, 2 and that has high safety with high self-protective performance.

The present embodiment is described in detail above with reference to the drawings; however, a specific configuration is not limited to the above embodiment. The invention also encompasses design changes, and the like, without departing from the scope of the invention. For example, in the film capacitor according to the above-described embodiment of the invention, the rolled film capacitor is described. Instead, the invention is applicable to a stacked film capacitor.

(Example) Hereinafter, an example of the film capacitor according to the invention based on the configuration of the above-described embodiment will be described.

Smooth dielectric films (PVDF films) with small surface unevenness were used, and several film capacitors according to the example of the invention based on the configuration of the above-described embodiment were manufactured. Several film capacitors according to a comparative example, which had the same configuration as that of the film capacitors according to the example except that dielectric films had no through portions, were manufactured.

A voltage of 1 kV is applied to each of the manufactured film capacitors according to the example and comparative example, and efficiency percentages (percentages of non-defective products) were determined. Table 1 shows the efficiency percentage of the film capacitors according to the example and the efficiency percentage of the film capacitors according to the comparative example. A non-defective product is a film capacitor in which occurrence of a short circuit or thermal runaway is prevented by self-protective performance.

TABLE 1

|  | Example | Comparative Example |
|---|---|---|
| Efficiency Percentage | 100% | 40% |

As shown in Table 1, the efficiency percentage of the film capacitors according to the example of the invention, in which one of the dielectric films had the through portions provided in the areas corresponding to the slits adjacent to the fuse portions, was 100%. In contrast, the efficiency percentage of the film capacitors according to the comparative example, in which the dielectric films had no through portions, was 40%. The above results show that the film capacitors according to the example of the invention have high safety with high self-protective performance.

What is claimed is:

1. A film capacitor comprising:
   a pair of mutually opposed dielectric films; and
   evaporated electrodes respectively provided on the pair of dielectric films, wherein
   the evaporated electrode provided on one of the pair of dielectric films includes slits that are regions in which the evaporated electrode is not provided, a plurality of electrode regions defined by the slits, and at least one fuse portion that connects the electrode regions adjacent to each other, and
   the one dielectric film, on which the evaporated electrode including the slits and the at least one fuse portion is provided, includes at least one through portion that extends through the one dielectric film in a thickness direction, the at least one through portion being provided in at least one area corresponding to at least one of the slits adjacent to the at least one fuse portion.

2. The film capacitor according to claim 1, wherein each of the at least one through portion is constituted by a cut portion provided in the one dielectric film to extend along the corresponding slit.

\* \* \* \* \*